United States Patent
Gil Mollà

(10) Patent No.: US 9,945,350 B2
(45) Date of Patent: Apr. 17, 2018

(54) INSTALLING A BLADE IN A WIND TURBINE AND WIND TURBINES

(71) Applicant: ALSTOM RENEWABLE TECHNOLOGIES, Grenoble (FR)

(72) Inventor: Isaac Gil Mollà, Nantes (FR)

(73) Assignee: GE Renewable Technologies Wind B.V., Breda (NL)

( * ) Notice: Subject to any disclaimer, the term of this patent is extended or adjusted under 35 U.S.C. 154(b) by 292 days.

(21) Appl. No.: 14/657,307

(22) Filed: Mar. 13, 2015

(65) Prior Publication Data

US 2015/0275851 A1   Oct. 1, 2015

(30) Foreign Application Priority Data

Mar. 31, 2014   (EP) ..................................... 14382120

(51) Int. Cl.
| | | |
|---|---|---|
| *F03D 13/10* | (2016.01) | |
| *F03D 1/00* | (2006.01) | |
| *F03D 1/06* | (2006.01) | |
| *F03D 13/20* | (2016.01) | |
| *F03D 80/50* | (2016.01) | |

(52) U.S. Cl.
CPC ........... *F03D 1/001* (2013.01); *F03D 1/0675* (2013.01); *F03D 1/0691* (2013.01); *F03D 13/10* (2016.05); *F03D 13/20* (2016.05); *F03D 80/50* (2016.05); *F05B 2230/604* (2013.01);
(Continued)

(58) Field of Classification Search
CPC .......... F03D 13/10; F03D 13/40; F03D 80/50; F03D 80/55; F03D 1/0658; F03D 1/0666
See application file for complete search history.

(56) References Cited

U.S. PATENT DOCUMENTS

| | | | | |
|---|---|---|---|---|
| 7,874,805 B2 * | 1/2011 | Pedersen | ................... | B66C 3/00 |
| | | | | 416/204 R |
| 8,083,212 B2 | 12/2011 | Numajiri et al. | | |
| 9,446,446 B2 * | 9/2016 | Gabeiras | .................. | B21K 3/04 |

FOREIGN PATENT DOCUMENTS

| | | | | |
|---|---|---|---|---|
| CA | 2817353 A1 * | 12/2013 | ............. | A45C 11/00 |
| EP | 2 672106 | 12/2013 | | |

(Continued)

OTHER PUBLICATIONS

European Search Report for EP14382120, dated Jul. 18, 2014, 6 pgs.

*Primary Examiner* — Logan Kraft
*Assistant Examiner* — Sabbir Hasan
(74) *Attorney, Agent, or Firm* — Dority & Manning, P.A.

(57) ABSTRACT

Methods of installing a blade in a wind turbine are provided, the wind turbine comprising a tower, a nacelle and rotor hub, the rotor hub comprising a guiding element. The method includes providing a blade holder, wherein the blade holder comprises a beam, the beam being attached to the blade holder. The method further includes providing lifting equipment for lifting the blade holder, attaching the blade holder to the blade, wherein the blade comprises a mount for mounting the blade to the rotor, connecting the lifting equipment to the blade holder, hoisting the blade holder with the blade towards the rotor hub, arranging the beam near the guiding element, bringing the guiding element and the beam in contact with each other and attaching the blade mount to the rotor hub. Wind turbines comprising a rotor hub, the rotor hub comprising a guiding element are also disclosed.

14 Claims, 3 Drawing Sheets

(52) U.S. Cl.
CPC ......... *F05B 2230/61* (2013.01); *Y02E 10/721* (2013.01); *Y02P 70/523* (2015.11); *Y10T 29/49321* (2015.01)

(56) References Cited

FOREIGN PATENT DOCUMENTS

| KR | 101 324962 B1 | 11/2013 | |
| WO | WO 2013/051167 | 4/2013 | |
| WO | WO 2013051167 A1 * | 4/2013 | ............. F03D 1/001 |

* cited by examiner

INSTALLING A BLADE IN A WIND TURBINE AND WIND TURBINES

This application claims the benefit of European Patent Application No. EP 14382120.5 filed on 31 Mar. 2014, which is hereby incorporated by reference in its entirety.

The present disclosure relates to methods of installing a blade in a wind turbine and wind turbines adapted to carry out such a methods.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

During installation, one or more blades are to be mounted to the wind turbine hub. The hub comprises a plurality of annular mounting flanges with openings. The blade comprises a plurality of fasteners, such as bolts, or pins or studs at its blade root. During installation, these fasteners are to be fitted into the openings in the mounting flanges.

The installation of wind turbine blades has become more and more of a challenging task due to the general tendency to considerably increase the size and weight of modern wind turbines. During installation, the wind turbine blade may be hoisted towards the rotor hub. An aerodynamic force may be exerted on the wind turbine blade and may provoke sudden movements and possibly oscillations of the blade during the hoisting operation. Fitting the blade to a hub may thus be complicated and time-consuming.

Frequent difficulties may arise during the lifting operation due to oscillations. In order to perform the installation of the blade, manual aid may often be required. This can lead to an increase of the risk for the operator especially if the operator may be standing directly under or near the load.

The oscillation during hoisting operation may also lead to possible damage to the wind turbine blade or to other parts of the wind turbine. Another complicating factor may be delays during the installation process. This may lead to an increase in the cost of installation, especially in offshore installations where the use of dedicated vessels may be required. The operational cost of installation may be increased significantly.

Wind turbine farms are often situated in remote landscapes, on hill-tops or offshore locations and typically in these places the lifting of the wind turbine blade may be subjected to high winds.

In order to reduce oscillations of blades, the use of tagline systems is known, i.e. control ropes from a vessel or crane that are tied to a blade to prevent oscillations. One problem with these systems may be that they may not completely prevent movements and blade oscillations caused by the wind. A further disadvantage of these systems may be that during gusts of wind there may be a risk of the control ropes being cut on the sharp edges of the blade to be installed. A tagline or rope may also damage a blade by rubbing against it.

The examples of methods and components of the present disclosure seek to at least partially reduce one or more of the aforementioned problems.

SUMMARY

In a first aspect, a method of installing a blade in a wind turbine is provided. The wind turbine comprises a tower, a nacelle positioned on top of the tower and a rotor hub positioned on the nacelle, the rotor hub comprising a guiding element. The method comprises the steps of: providing a blade holder for holding a blade, wherein the blade holder comprises a stabilization beam, the stabilization beam being attached to the blade holder. The method further includes providing lifting equipment for lifting the blade holder and attaching the blade holder to the blade, wherein the blade comprises a blade mount for mounting the blade to the rotor hub. Then, the lifting equipment is connected to the blade holder; and the blade holder with the blade is hoisted towards the rotor hub with the lifting equipment. The stabilization beam can be arranged near the guiding element and the guiding element and the stabilization beam can be brought into contact with each other. Then, the blade mount may be attached to the rotor hub.

It has been found that to avoid or to reduce the oscillations of the blade during installation, a rigid and stable support may be an advantage. In this respect, a guiding element that may perform such a function may be provided in the wind turbine rotor hub.

The guiding element may be attached to one end of the wind turbine rotor hub. The stabilization beam may be provided attached to the blade holder. The guiding element may be used during installation, as the stabilization beam may be brought into contact with it and the stabilization beam can thus support the stabilization beam (and thus the blade) during the installation of the blade. Oscillations of the blade turbine component during installation may thus be reduced and the stability may be improved. This way, the installation of the blade in a wind turbine may be performed in a relatively easy manner.

In some implementations, the guiding element may be removed after the installation of the blades. The guiding element may thus be used on another wind turbine. The aerodynamic performance of the hub in these cases is also not affected. Alternatively, the guiding element may remain attached to the rotor hub after the installation of the blades.

In some examples, the guiding element may be telescopic, and may be extended and/or withdrawn in a substantially parallel direction to the rotational axis of the rotor and/or the guiding element may be provided with one or more actuators for controlling a position. The guiding element may thus have improved control. This may be useful to obtain contact with the stabilization bar of the blade holder but may also be useful for guiding the stabilization bar towards the hub.

BRIEF DESCRIPTION OF THE DRAWINGS

Non-limiting examples of the present disclosure will be described in the following, with reference to the appended drawings, in which.

DETAILED DESCRIPTION

Figure 1:
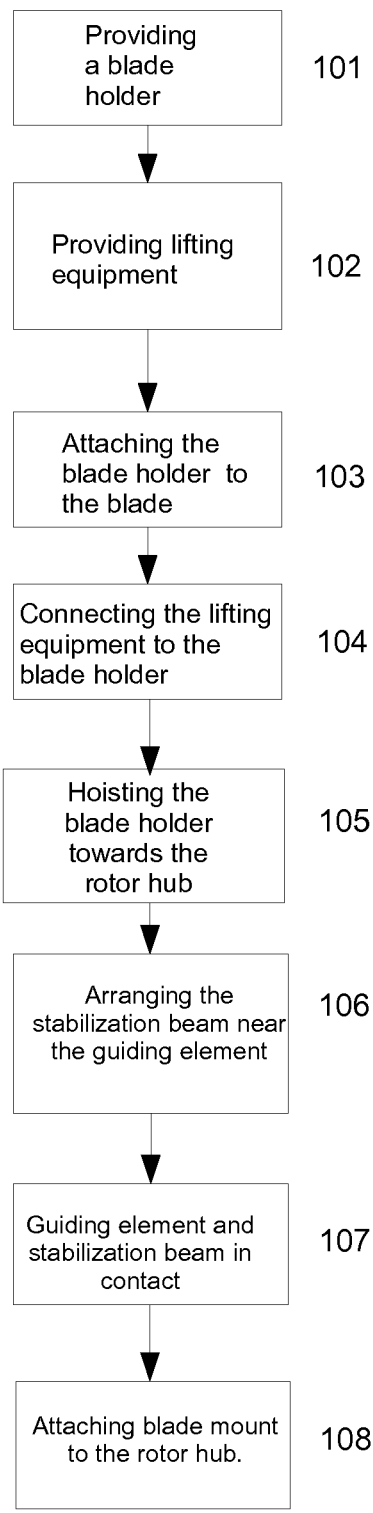
FIG. 1 is an illustration of a block diagram describing an example of a method of installing a blade in a wind turbine.

FIG. 1 is an illustration of a block diagram describing an example of a method of installing a blade in a wind turbine. At block 101, a blade holder may be provided. The blade holder may be e.g. a device for clamping a blade or may be a lifting beam with one or more controllable slings around the blade.

The blade holder may comprise a stabilization beam, such as e.g. a bar. The stabilization beam may be attached to the blade holder, optionally at a proximal end of the stabilization beam.

At block 102, a lifting equipment is provided such as e.g. a crane. The lifting equipment may also be provided with a steering mechanism. At block 103, the blade holder may be attached to the blade. The blade may comprise a blade mount e.g., a blade flange with fasteners for eventually mounting the blade to a rotor hub.

At block 104, the lifting equipment may further be connected to the blade holder. At block 105, the blade holder may be hoisted towards the rotor hub. At block 106, the stabilization beam may be arranged near the hub's guiding element, for example a distal end portion of the stabilization beam may be brought into the proximity of the hub's guiding elements.

Then, at block 107, the guiding element and the stabilization beam may be brought into contact with each other. By bringing the guiding element in contact with the stabilization beam or bar, it may be achieved that the blade can be more easily attached to the rotor hub, as oscillations and other movements can be reduced or avoided, block 108.

Figure 2:
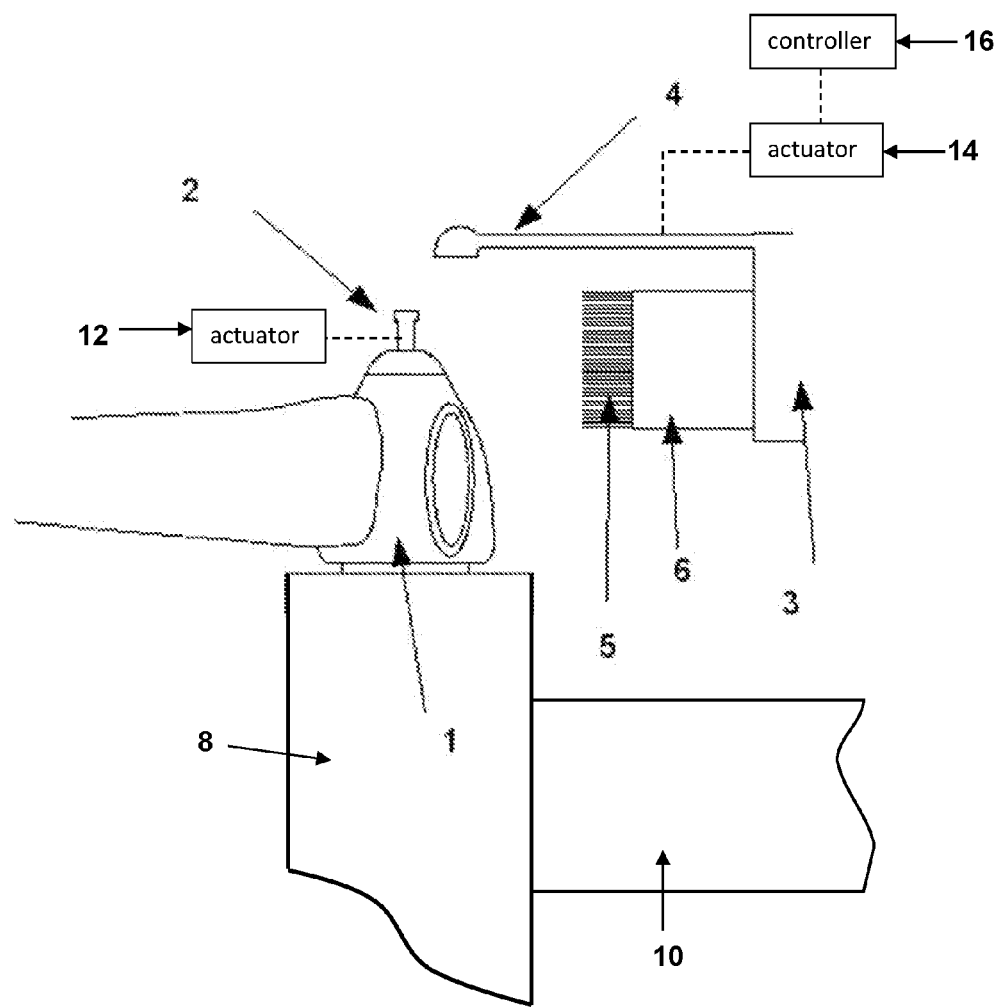
FIG. 2 shows an example of installing a blade in a wind turbine according to an implementation.

FIG. 2 shows an example of installing a blade 6 in a wind turbine, the blade 6 having bolts 5 for connecting to the rotor hub 1. A proximal end of a guiding element 2 may be attached to the rotor hub 1, the rotor hub 1 positioned on a nacelle 8, which is mounted atop a tower 10. The guiding element on the hub may be an elongated element, extending substantially forward. The elongated guiding element 2 may be substantially aligned with the rotational axis of the rotor hub 1.

The blade 6 may be attached to the blade holder 3. A stabilization bar 4 may be attached to the blade holder 3 at a proximal end of the stabilization bar. The blade holder 3 may be connected to a lifting equipment such as a crane (not shown).

In this particular example, the elongated guiding element 2 may be removed such the element may be reused on some other rotor hub. Alternatively, the elongated guiding element 2 could instead remain in its location after installation.

The elongated guiding element 2 may be telescopic and configured to be extended or withdrawn in a substantially parallel direction to the rotational axis of the rotor. The performance of the elongated guiding element 2 may thus be improved. The guiding element may be configured to matingly receive a portion of the stabilization beam. The guiding element may for example comprise a hole in which the stabilization beam may be fitted. In this example, the guiding element not only serves for support and stabilization of a blade, but may also serve to actively steer a root portion of a blade towards the hub. The shape of the hole and a portion of the stabilization beam may be such that they can form an interlocking engagement. In some examples, the guiding element and the stabilization beam may be locked together. E.g. an active or a passive system may be incorporated in the guiding element (or in the stabilization beam) for such locking.

The elongated guiding element 2 may be provided with actuators 12 adapted to control the position of the guiding element. The maneuverability of the guiding element may thus be improved. When the stabilization beam of the blade holder is in contact with or coupled to the stabilization beam, a movement of the stabilization beam can lead to moving the blade holder (and thus the blade) in a desired direction. Particularly in the case of a coupling or mating connection between the guiding element and the stabilization beam, control over the blade can be improved as compared to e.g. the mere use of tag lines.

The stabilization beam (4) may be provided with actuators 14 and a control mechanism 16 adapted to control the position of a distal end of the stabilization beam. The beam or bar may be telescopic, or may e.g. move or slide along a track or guide of the blade holder. When needed, the stabilization beam may thus be more easily brought into contact with the guiding element.

Figure 3:
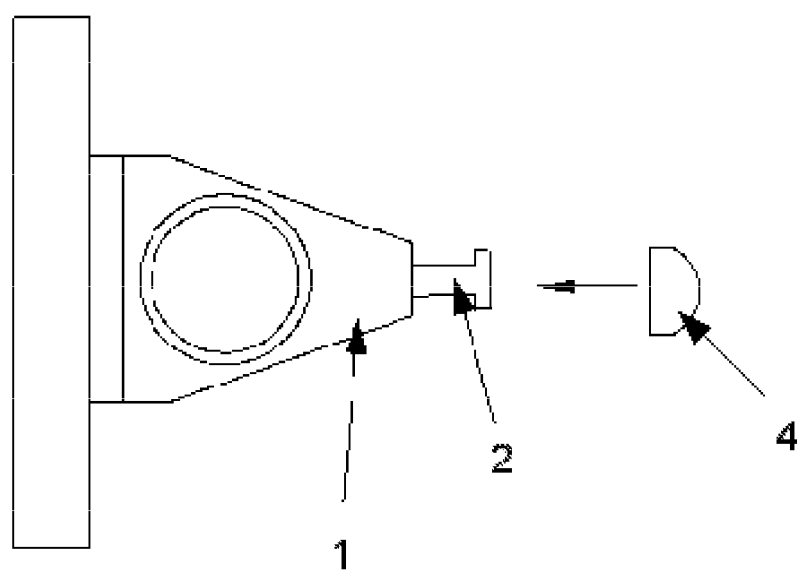
FIG. 3 shows an example of coupling a guiding element of a hub and the stabilization beam according to an implementation.

FIG. 3 shows an example of a distal end of the stabilization beam 4 that may be coupled to the distal end of the elongated guiding element 2. The stabilization beam 4 may be attached to the blade holder (not shown), e.g. at a proximal end. The distal end of the stabilization beam (4) may be coupled to the distal end of the elongated guiding element (2). The shapes of the relevant portions of the stabilization beam and guiding element may thus be substantially complimentary. In these examples, extra stability may be provided during installation of the blade.

Although only a number of examples have been disclosed herein, other alternatives, modifications, uses and/or equivalents thereof are possible.

Furthermore, all possible combinations of the described examples are also covered. Thus, the scope of the present disclosure should not be limited by particular examples, but should be determined only by a fair reading of the claims that follow.

The invention claimed is:

1. A method of installing a blade in a wind turbine comprising a tower, a nacelle positioned on top of the tower and a rotor hub positioned on the nacelle, the rotor hub comprising a guiding element, the method comprising:
    providing a blade holder for holding the blade, wherein the blade holder comprises a stabilization beam;
    providing lifting equipment for lifting the blade holder;
    attaching the blade holder to the blade, wherein the blade comprises a blade mount for mounting the blade to the rotor hub;
    connecting the lifting equipment to the blade holder;
    hoisting the blade holder with the blade towards the rotor hub with the lifting equipment with the blade oriented such that the stabilization beam is clear from under the nacelle or rotor hub;
    orienting the blade and blade holder such that the distal end of the stabilization beam is brought into proximity of the guiding element;
    bringing the guiding element and the stabilization beam into direct contact with each other along a line of direction that is parallel to a rotational axis of the rotor hub; and
    attaching the blade mount to the rotor hub.

2. A method according to claim 1, wherein the guiding element is attached to the rotor hub so as to be substantially aligned with a rotational axis of the rotor hub.

3. A method according to claim 1, wherein the guiding element is removable from an inside of the wind turbine.

4. A method according to claim 1, wherein the guiding element is permanently fixed to the rotor hub.

5. A method according to claim 1, wherein the guiding element is configured to be extended or withdrawn in a substantially parallel direction to a rotational axis of the rotor.

6. A method according to claim 1, wherein the guiding element is provided with one or more actuators for controlling a position of the guiding element.

7. A method according to claim 1, wherein the blade holder comprises a stabilization beam provided with one or more actuators for controlling a position of the distal end of the stabilization beam.

8. A wind turbine comprising a tower, a nacelle positioned on top of the tower and a rotor hub positioned on the nacelle, the rotor hub comprising a guiding element substantially aligned with a rotational axis of the rotor hub, the guiding element movably configured on the rotor hub to movably extend or withdraw in an axial direction relative to the rotor hub in a substantially parallel direction to the rotational axis of the rotor hub to couple with a stabilization beam of a blade holder.

9. A method of installing a blade in a wind turbine comprising a tower, a nacelle positioned on top of the tower and a rotor hub positioned on the nacelle, the rotor hub comprising a guiding element, the method comprising the steps of:
  providing a blade holder for holding the blade, wherein the blade holder comprises a stabilization beam provided with one or more actuators for controlling a position of the distal end of the stabilization beam;
  providing lifting equipment for lifting the blade holder;
  attaching the blade holder to the blade, wherein the blade comprises a blade mount for mounting the blade to the rotor hub;
  connecting the lifting equipment to the blade holder;
  hoisting the blade holder with the blade towards the rotor hub with the lifting equipment;
  arranging the stabilization beam near the guiding element;
  bringing the guiding element and the stabilization beam into contact with each other; and
  attaching the blade mount to the rotor hub.

10. A method according to claim 9, wherein the guiding element is attached to the rotor hub so as to be substantially aligned with a rotational axis of the rotor hub.

11. A method according to claim 9, wherein the guiding element is removable from an inside of the wind turbine.

12. A method according to claim 9, wherein the guiding element is permanently fixed to the hub.

13. A method according to claim 9, wherein the guiding element is movably configured on the rotor hub to extend or withdraw in a substantially parallel direction to a rotational axis of the rotor.

14. A method according to claim 9, wherein the guiding element is provided with one or more actuators for controlling a position of the guiding element.

* * * * *